United States Patent [19]

Anders et al.

[11] Patent Number: 4,462,721
[45] Date of Patent: Jul. 31, 1984

[54] VISUAL CUSTOMER TERMINAL CONSTRUCTION FOR PNEUMATIC TUBE BANKING SYSTEM

[75] Inventors: Walter G. Anders, North Canton; Leo J. Grosswiller, Jr., East Canton, both of Ohio

[73] Assignee: Diebold Incorporated, Canton, Ohio

[21] Appl. No.: 385,850

[22] Filed: Jun. 7, 1982

[51] Int. Cl.³ .............................................. B65G 51/26
[52] U.S. Cl. ...................................... 406/112; 406/27; 406/176; 406/148; 406/180
[58] Field of Search ........ 406/110, 111, 112, 147–150, 406/176–180, 27

[56] References Cited

U.S. PATENT DOCUMENTS 3,610,554 10/1971 Schwarz ................................ 406/112
4,135,684 1/1979 Willey .................................... 406/13
4,343,574 8/1982 Anders .................................. 406/13

FOREIGN PATENT DOCUMENTS 1220792 2/1965 Fed. Rep. of Germany ...... 406/176

Primary Examiner—Jeffrey V. Nase
Assistant Examiner—L. E. Williams
Attorney, Agent, or Firm—Frease & Bishop

[57] ABSTRACT

A simplified construction of a customer terminal for a single conveyor tube visual banking service pneumatic tube system to which a teller terminal also is connected. The customer terminal has a cylindrical carrier-receiving pocket extension connected to the system tube. The pocket is formed by two molded plastic members, one fixed in the terminal cabinet and one a door. The members are hinged together so that the door may be opened for carrier placement or removal through a fixed member opening which provides access to the pocket when the door is opened. The door is biased open and is closed manually which automatically locks the door closed and pressurizes the system to send a carrier from the terminal. A carrier delivered to the terminal during system vacuum operation automatically opens the door. The system airflow terminal connection provides an air brake effect to abruptly arrest carrier movement avoiding noise and shock. The joint between the enclosure members has a special seal which prevents system air pressure or vacuum loss. A simple door closing mechanism is provided in event of failure to close the door.

25 Claims, 23 Drawing Figures

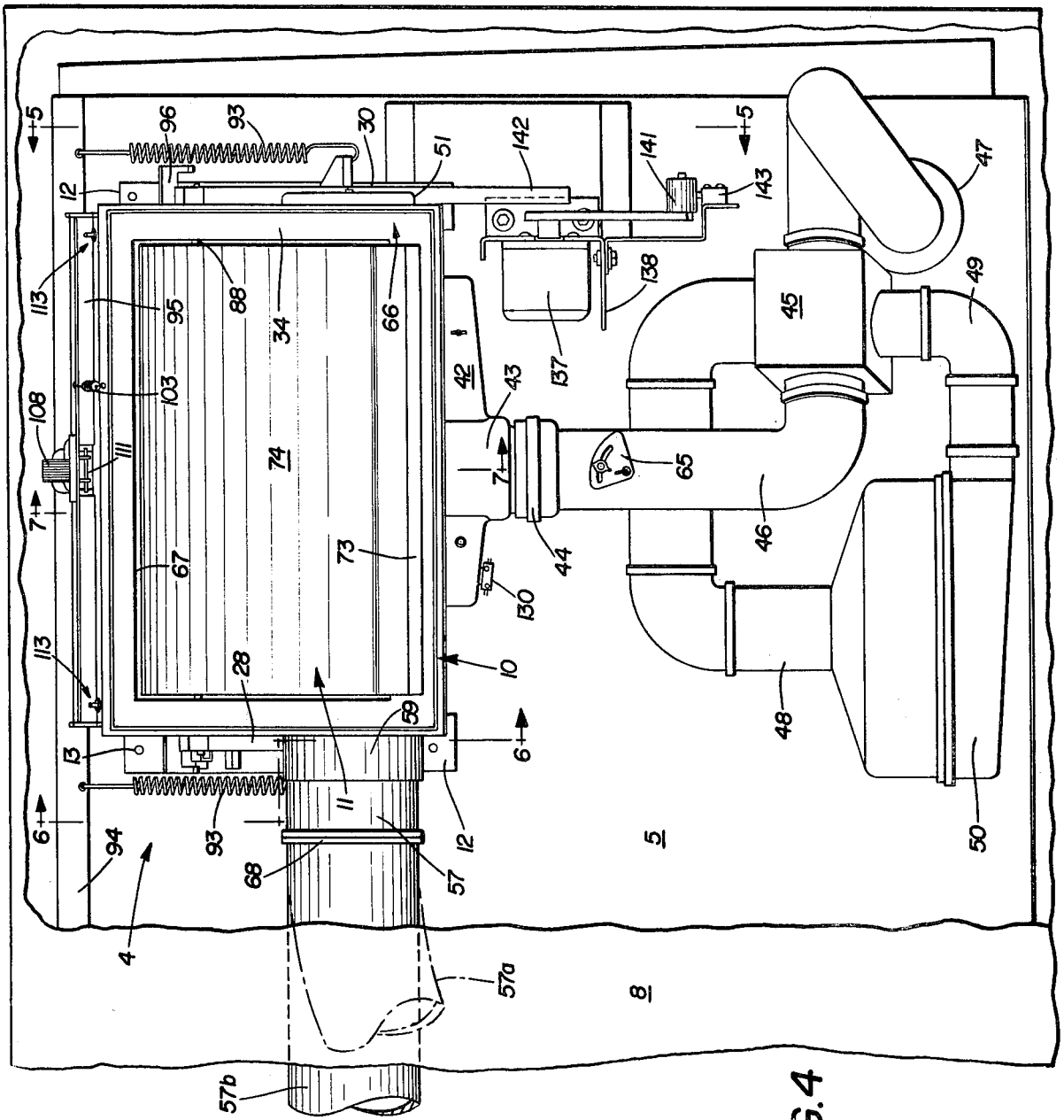
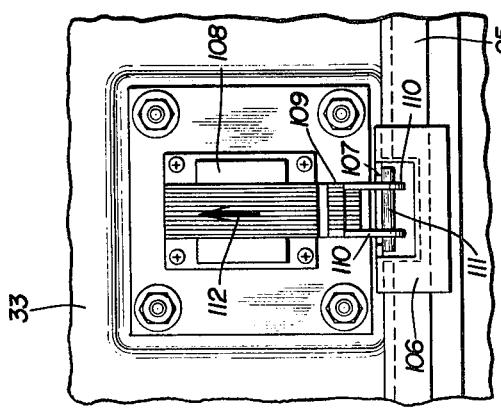
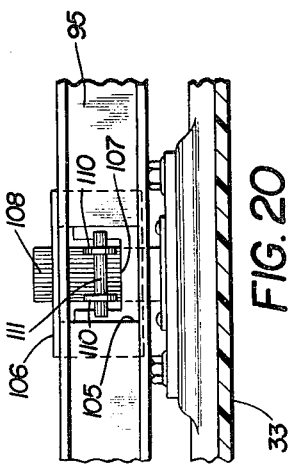
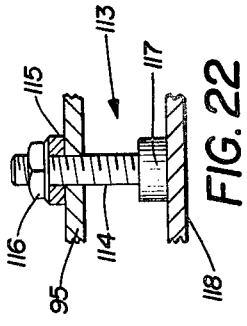
FIG. 4
FIG. 21
FIG. 20
FIG. 22

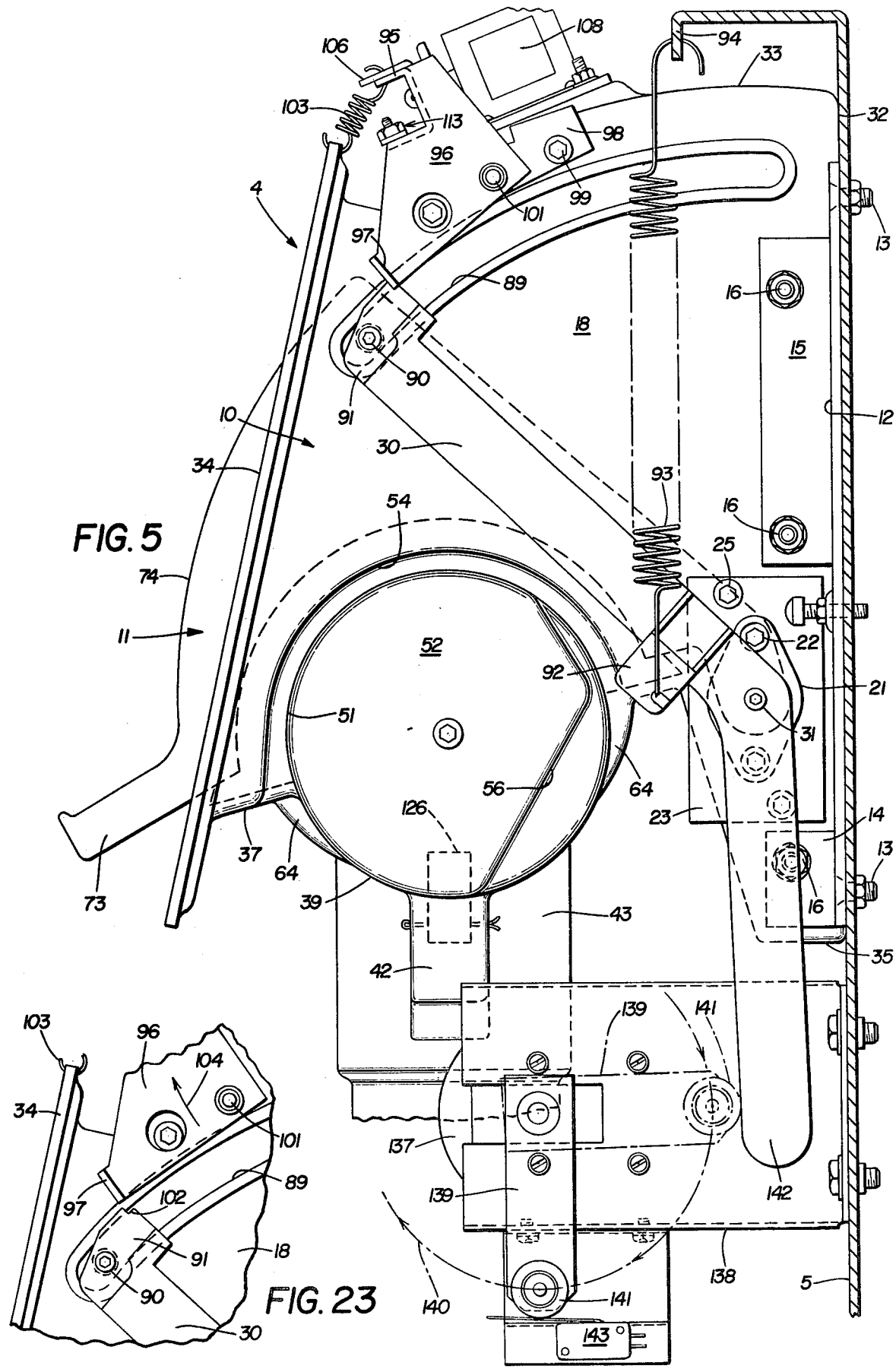

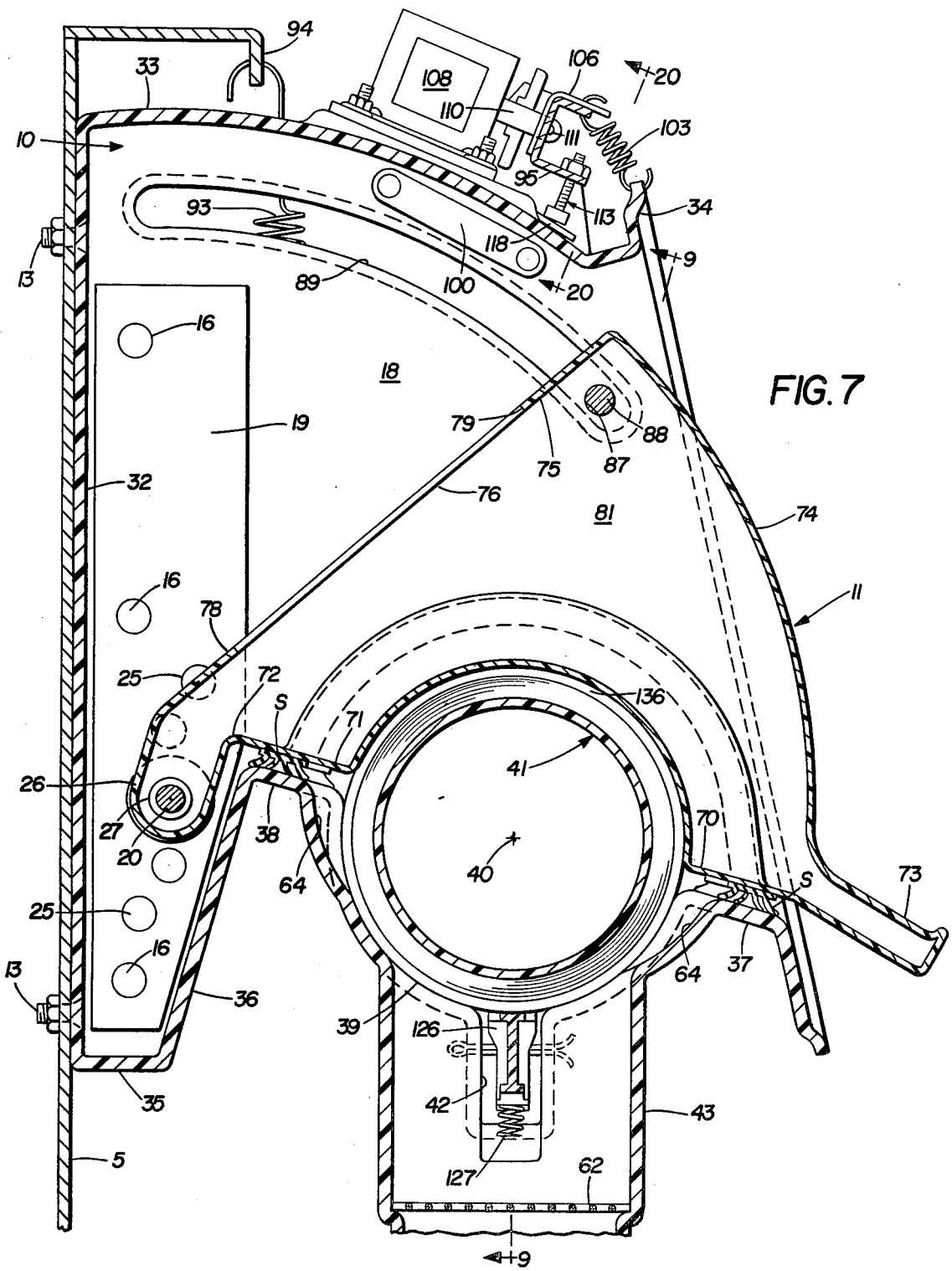
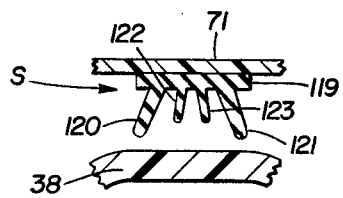
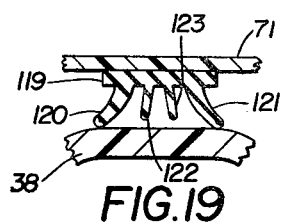
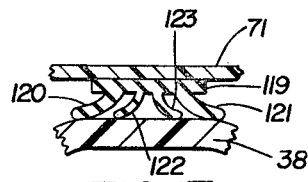

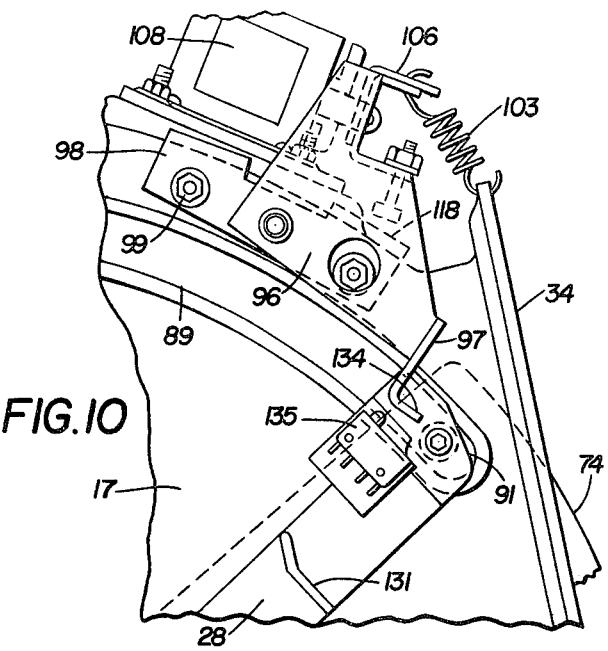
FIG.10
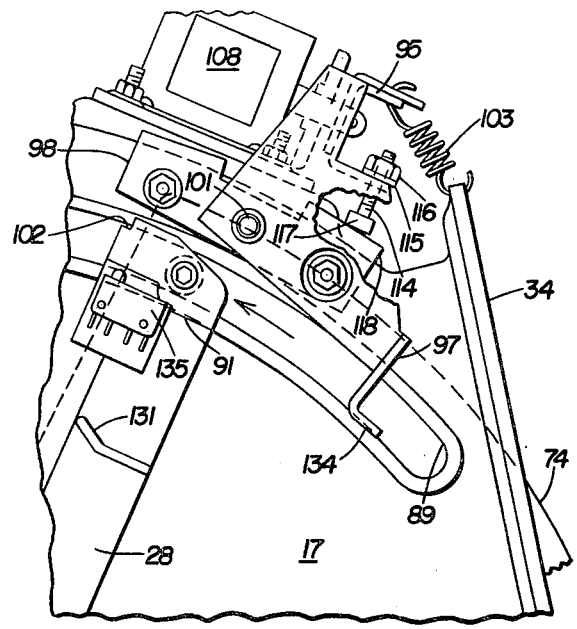
FIG.11
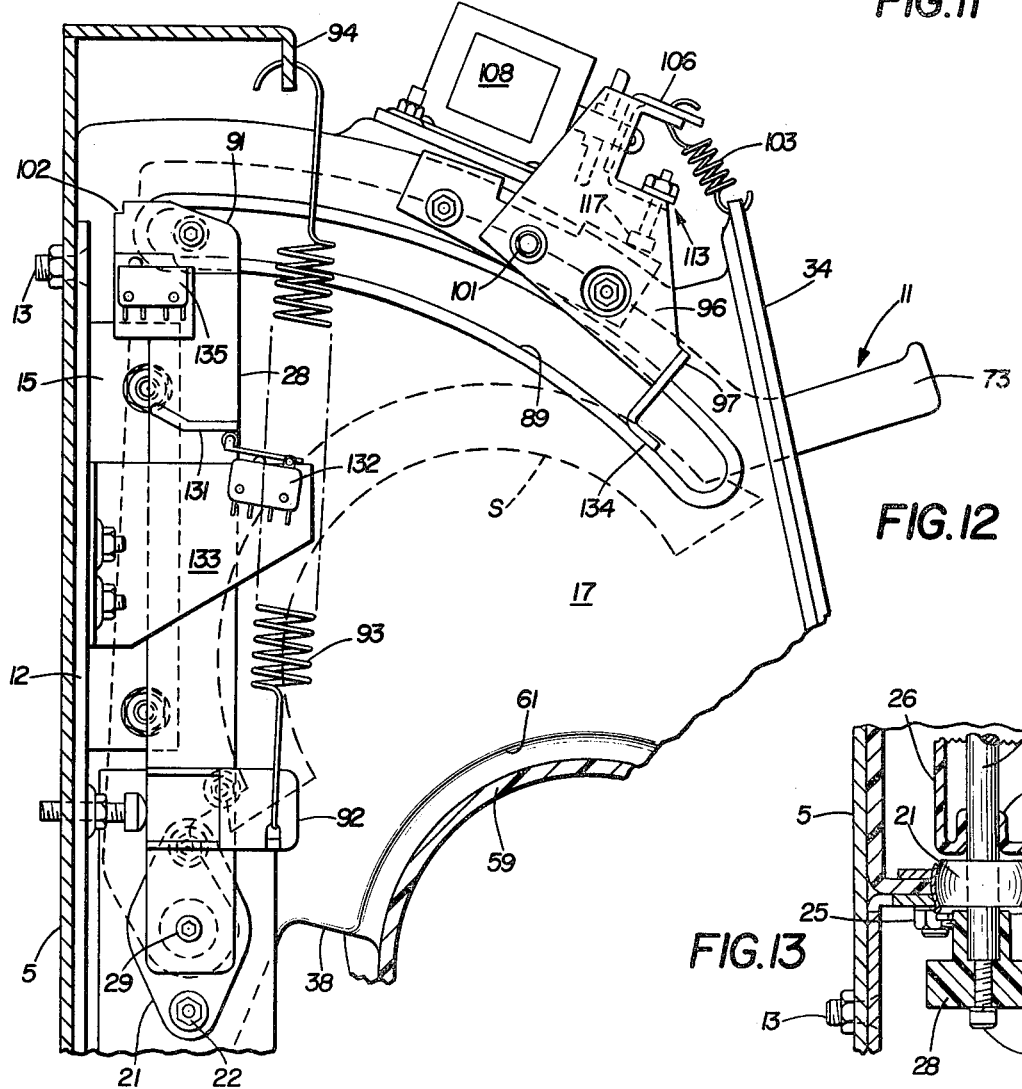
FIG.12
FIG.13

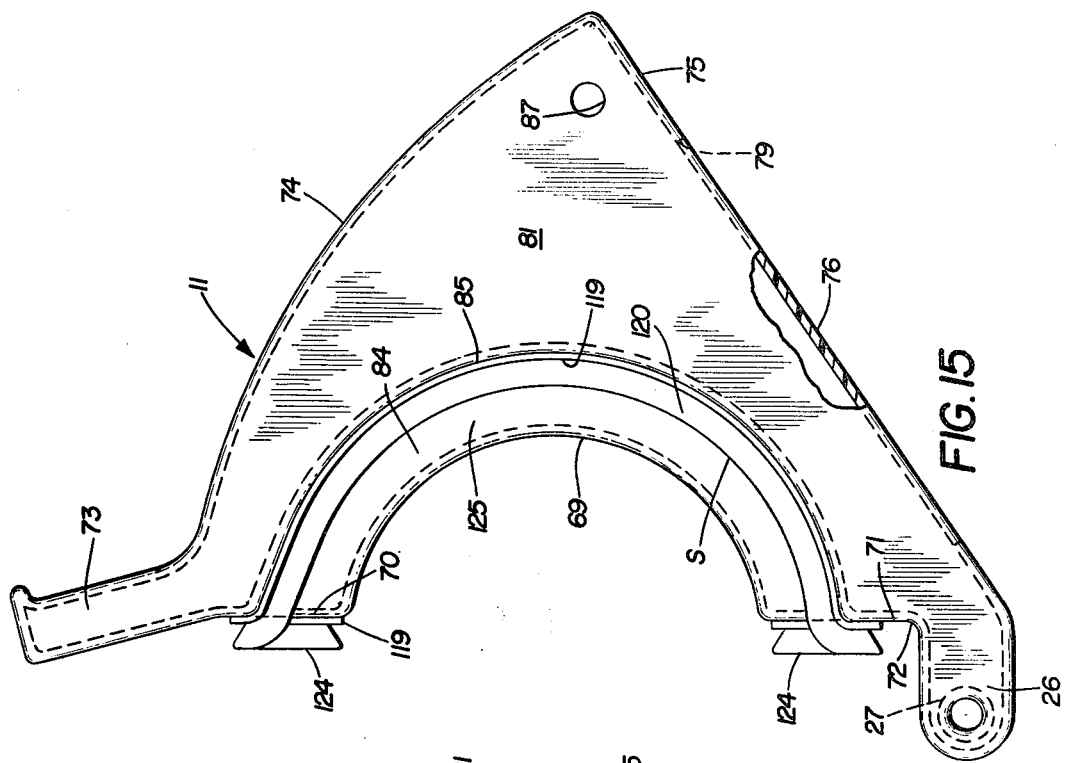
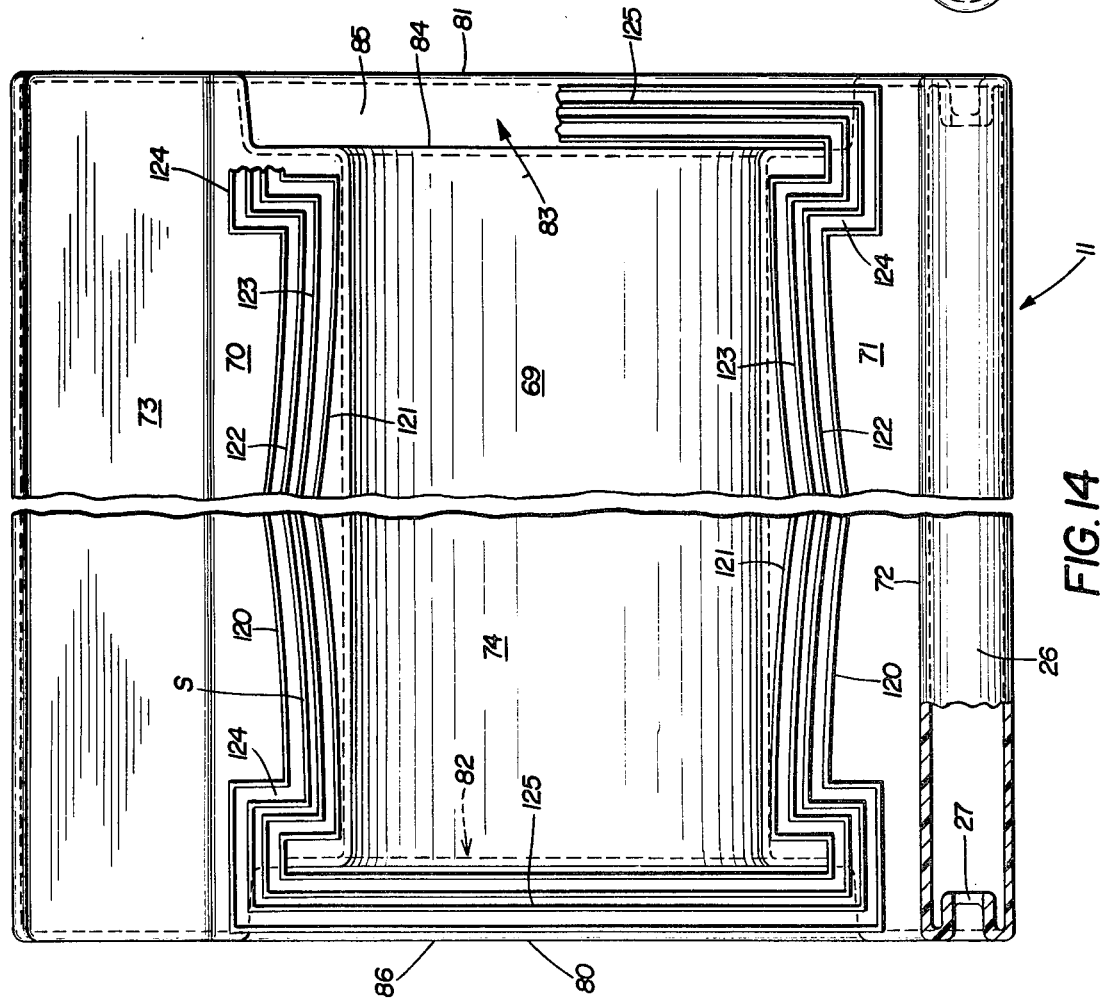

VISUAL CUSTOMER TERMINAL CONSTRUCTION FOR PNEUMATIC TUBE BANKING SYSTEM

CROSS-REFERENCE TO RELATED PATENTS

The visual customer terminal construction for pneumatic tube banking systems comprises improvements over the constructions of devices shown in U.S. Pat. No. 4,059,246 and in copending Anders application Ser. No. 156,690 now U.S. Pat. No. 4,343,574.

BACKGROUND OF THE INVENTION

1. Field of the Invention

The invention relates to a single-tube pneumatic system for conveying a carrier to transport banking media rapidly by differential air pressure back and forth between a customer station and teller station, the customer station being situated at a driveup location visible by a teller from the teller station inside a bank building. More particularly, the invention relates to a customer terminal construction for such tube system, at which a carrier is received or from which the carrier is sent, having a simple and inexpensive mechanism for facilitating transfer of a carrier to and from the tube system by a customer in an auto at the customer station.

Further, the invention relates to such simple and inexpensive mechanism having a pair of enclosure members generally semi-cylindrical in shape or configuration hinged on a longitudinal axis for movement between open and closed positions, forming, when closed, a customer terminal enclosure for the end of the system tube, and which, when opened, allows a customer to remove or replace a carrier out of or into a semi-cylindrical pocket in one of the enclosure members.

Also, the simplified terminal construction of the invention involves eliminating the requirement of a motor drive for opening and closing the enclosure members in a terminal cabinet. One of such members is fixed and the other moves on the hinged connection between open and closed positions. The movable member normally is biased to open position but is manually closed by the customer and is automatically latched in closed position when moved to such position.

In addition, the invention relates to a cooperative arrangement and connection between the terminal enclosure formed by the hingedly connected enclosure members and the blower and air shifter components of the pneumatic system which supplies pressure or vacuum to the system to propel a carrier to or from the customer terminal; so that system air propelling a carrier into the customer terminal arrests, "brakes", or stops carrier movement upon arrival in the enclosure without forcefully striking, bumping or otherwise shocking an end wall of the enclosure beyond the arriving carrier.

Further, the invention relates to a new seal construction provided for sealing the surrounding joint between the hinged separable enclosure members when closed, to prevent system air leakage when operating under pressure or vacuum modes.

In accordance with the invention, perchance there is failure to close the customer terminal enclosure, the terminal construction is provided with means actuated by a teller for security purposes, to close the movable enclosure member or door.

Finally, the invention relates to a construction wherein the customer terminal enclosure formed by the hinged enclosure members is oriented on a horizontal axis which adapts the customer terminal to be connected with the single tube of the system by a horizontally oriented system tube end portion, whereby the system tube may be connected either overhead or underground with a teller terminal at the teller station.

2. Description of the Prior Art

Many types and kinds of pneumatic tube system customer terminals are known for carrying out banking services between a customer drive-up station and a teller inside a bank building at a teller station with visibility between the customer and the bank teller.

U.S. Pat. No. 3,610,554 shows a pneumatic tube banking system customer terminal wherein a clamshell type device having hinged semi-cylindrical sections, in turn hinge-connected to a terminal structure is adapted, when closed, to form a continuation of an end of a system tube, and when opened, to provide the clamshell outward of the terminal structure. This construction requires a motor drive to open and close the clamshell device, and to project it from the terminal. The terminal projection of the open device may actually cause damage to a customer's auto or to the device if the customer happens to drive too close to the terminal.

U.S. Pat. No. 4,059,246 shows a pneumatic tube banking system wherein the customer terminal serves a multiple tube system with send and receive tubes connected with the terminal. This customer terminal requires special orientation of the carrier by the customer in returning the same to the terminal, and also has a large number of components.

U.S. Pat. No. 4,135,684 shows a customer terminal construction for a single tube system wherein a carrier access opening in the terminal housing has a sliding door mounted on linear ball slides. The door is movable between open and closed positions by a rack and gear mechanism driven by a reversible motor.

These prior devices require a multitude of components arranged in an intricate manner to satisfy the requirements for safety, and to render a carrier available for removal from or insertion into the terminal at an accessible location for easy manipulation by a customer. In prior single tube systems of which we are aware a motor is required for opening and closing a door or other access means to present or receive a carrier. All such devices have complicated constructions, have numerous parts requiring careful adjustment and difficult maintenance, and have high cost of manufacture.

Accordingly, a need exists in the field of drive-up visual banking service equipment for a simple pneumatic tube customer terminal construction having extremely simple components without requiring a motor drive means for normally opening and closing access to present or receive a carrier in a single tube system for convenient use by a customer seated in an adjacent vehicle, and which avoids the deficiencies and objectionable features described with respect to known prior art.

SUMMARY OF THE INVENTION

Objectives of the invention include providing a new construction, and coordination and arrangement of a few components of a simple character to form a customer terminal for a single tube pneumatic tube system adapted to conduct banking services between customer and teller terminals with visual comminication between a customer and a teller located at such terminals; providing such construction in which an enclosure is mounted within a terminal cabinet formed primarily of two enclosure members, one fixedly mounted on a terminal frame member and the other hinged to the fixed member serving as a door movable between closed position and an open position telescoped within the fixed member; providing such construction wherein the two enclosure members are formed of molded plastic material with semi-cylindrical walls providing pockets therein which, when the members are in closed position form a cylindrical pocket, recess or enclosure which constitutes a direct extension of the system tube which is connected with the enclosure; providing such construction with a latch mechanism latching the movable enclosure door member closed; providing such construction wherein upon the arrival of a carrier in the enclosure while the door is latched closed, the latch mechanism is automatically released, the system airflow is cut off, and the door is biased to open position; providing such construction wherein the door when open enables enclosure access by a customer to permit removal and replacement of a carrier from and into enclosure pocket; providing such construction wherein upon carrier replacement into the enclosure pocket the customer manually closes the door whereupon air suply to the enclosure is enabled to return the carrier to the connected system teller terminal; providing such construction in which the system air supply acts as an air brake to abruptly arrest carrier movement on arrival within the enclosure pocket to eliminate noise and provide negligible shock to the terminal; providing such construction with a compressible seal for the joint between the fixed and movable enclosure members when closed, effective to prevent system vacuum or pressure air leakage at the joint; providing such construction with a simple one-revolution motor, door closing device for actuation by a teller when the enclosure door is accidentally left open by a customer who fails to manually close the door; and providing such construction and arrangement which is formed of simple components, simply assembled, reliable in operation, readily serviced, requiring few adjustments, and extremely convenient to use, and which satisfies existing wants to the art as well as the indicated objectives.

These and other objectives and advantages may be obtained by the device generally described as a customer terminal for a single conveyor tube visual banking service pneumatic tube system of a type wherein carrier propelling vacuum or pressure airflow is supplied to the system by blower and air shifter units located in the terminal, and an end of said system conveyor tube is connected with the terminal; the improvement in which the terminal includes: a frame member mounted on a terminal base; a pair of enclosure members, one of which is provided with an access opening and is mounted in fixed position on said frame member, and the other of which is pivotally mounted on the fixed member and acts as a door for the fixed member access opening; the door enclosure member being movable between a closed position covering said access opening and an open position telescoped into the fixed enclosure member uncovering said access opening; each of the fixed and door enclosure members being formed of plastic material and having semi-cylindrical pocket forming wall portions; coupling means between an end portion of a system conveyor tube and the fixed enclosure member; the semi-cylindrical wall portions of said pair of enclosure members when in closed position forming a cylindrical extension of said system tube end portion with said cylindrical extension and said system tube end portion having the same internal diameter and their axes coinciding; and the fixed enclosure member having a closed-end-cup-wall connected with its semi-cylindrical wall portion at the end of said semi-cylindrical wall portion remote from said coupling means.

BRIEF DESCRIPTION OF THE DRAWINGS

A preferred embodiment of the invention—illustrative of the best mode in which applicants have contemplated applying the principles—is set forth in the following description and shown in the drawings and is particularly and distinctly pointed out and set forth in the appended claims.

FIG. 4 is an enlarged fragmentary view of a portion of FIG. 1, with parts of the front cabinet wall broken away, showing the system blower and air shifter contained within the customer terminal cabinet;

FIG. 5 is an end view, with parts broken away illustrating the improved terminal mechanism removed from the cabinet looking in the direction of the arrows 5—5, FIG. 4;

FIG. 7 is a sectional view similar to FIG. 6 taken on the line 7—7, FIG. 4, showing the enclosure door member closed;

FIG. 10 is a fragmentary view of an upper portion of FIG. 6 showing the latch mechanism unlatched to permit opening of the enclosure door;

FIG. 11 is a view similar to FIG. 10, but showing the enclosure door partly opened;

FIG. 12 is a view similar to FIGS. 10 and 11 showing the enclosure door completely open, as in FIG. 8, and showing the door actuating one of the control switches;

FIG. 13 is a fragmentary sectional view taken on the line 13—13, FIG. 6;

FIG. 14 is a plan view with parts broken away and in section looking at the inside of the enclosure door member removed from the mechanism, and showing the seal member thereon which seals the joint between the enclosure members when the door is closed;

FIG. 15 is a side view of the door shown in FIG. 14, also illustrating the seal member;

FIG. 16 is a fragmentary sectional view similar to a portion of FIG. 9 illustrating the seal construction before the enclosure door is completely closed;

FIG. 17 is an enlarged fragmentary view of the door mounted seal construction with the enclosure door closed, similar to a portion of FIG. 7;

FIG. 18 is a view similar to FIG. 17 showing the seal on a portion of the enclosure door, before contacting the fixed enclosure member to seal the joint between the fixed enclosure member and door;

FIG. 19 is a view similar to FIGS. 17 and 18 showing the seal just contacting a fixed enclosure member wall portion as the enclosure door is being closed;

FIG. 20 is a fragmentary view looking in the direction of the arrows 20—20, FIG. 7, illustrating the coupling between the latch for the enclosure door, and its actuating solenoid;

FIG. 21 is a fragmentary plan view of the parts shown in FIG. 20;

FIG. 22 is an enlarged fragmentary sectional view illustrating the construction of the adjustable stop for the door latch; and FIG. 23 is a view similar to an upper portion of FIG. 5 illustrating the unlatched state of the door latch.

Similar numerals refer to similar parts throughout the various figures of the drawings.

DESCRIPTION OF THE PREFERRED EMBODIMENT

Figure 1:
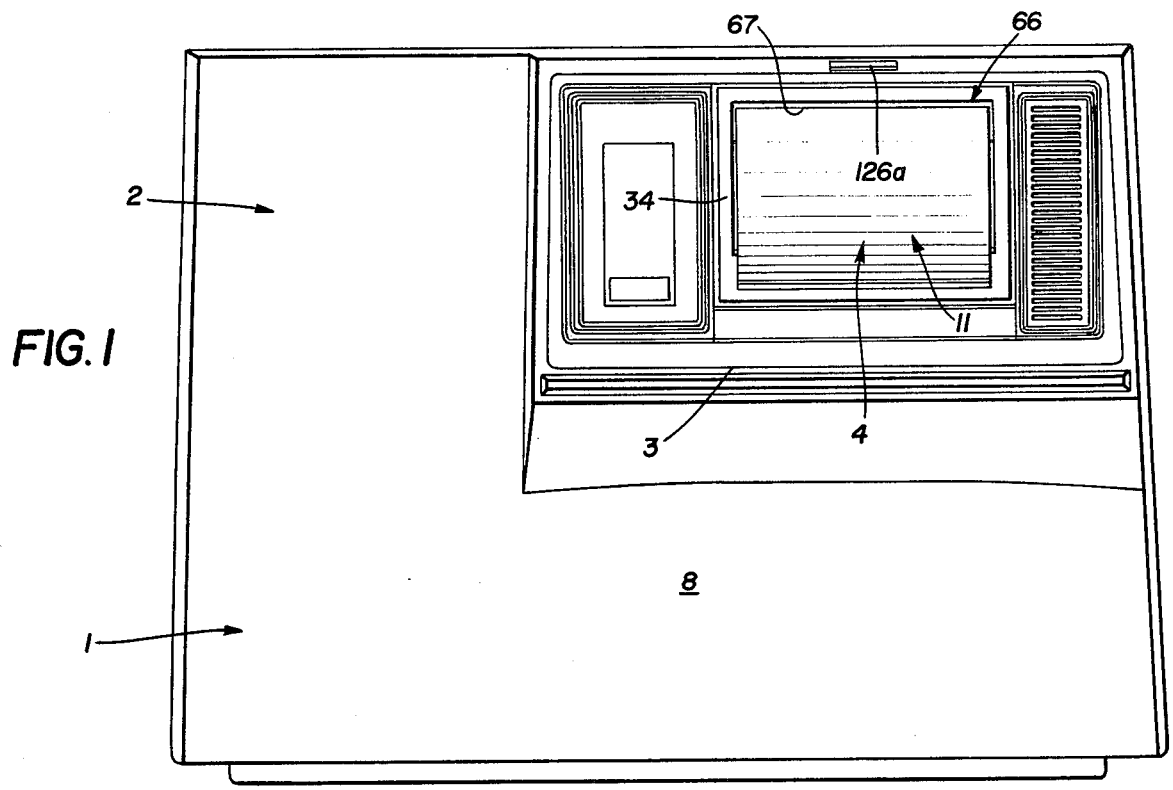
FIG. 1 is a front elevation of a pneumatic tube customer terminal equipped with the new construction.
Figures 2, 3:
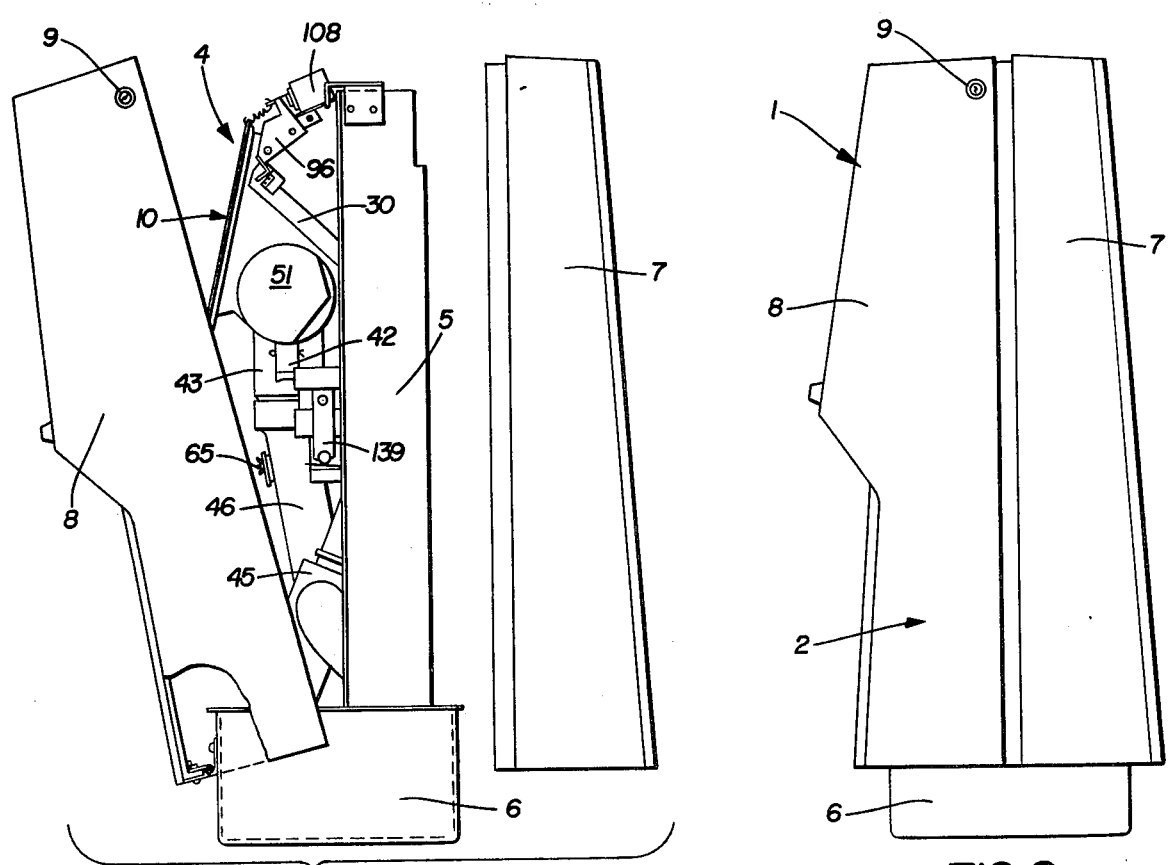
FIG. 2 is an end elevation of the terminal shown in FIG. 1.
FIG. 3 is a diagrammatic partially exploded view similar to FIG. 2 showing the terminal cabinet or shell portions removed or open to generally illustrate the terminal mechanism contained in the cabinet.

A pneumatic tube banking system visual customer terminal incorporating the concepts of the invention is indicated generally at 1. The terminal 1 is designed to permit communication and physcal banking transactions between such terminal located at a bank drive-up station and a teller terminal, located inside a bank building, with visual communication between the customer and teller and verbal communication by known audio systems.

Such a teller terminal may be one as generally indicated in said application Ser. No. 156,690 and also as indicated in application Ser. No. 178,559 now U.S. Pat. No. 4,352,603.

The drive-up station where the terminal 1 is located is available for use by a customer in an automobile which has approached the drive-up station so that the customer may see the bank teller through a window in the bank building and where the bank teller in the bank building may see the customer in the automobile. Several customer terminals may be served by one teller with the visual communication described, as in known customer terminal arrangements shown in U.S. Pat. No. 4,059,246.

The terminal 1 includes a cabinet generally indicated at 2, and the cabinet 2 has a framed opening 3 through which the customer terminal mechanism, generally indicated at 4 mounted within the cabinet 2, is accessible. The terminal mechanism 4 is mounted on a frame member 5 extending upward from a cabinet base 6 which may rest on a cement slab or platform, not shown, at the customer station. The mechanism 4 thus mounted on the cabinet base 6 preferably is enclosed by separable cabinet or shell members 7 and 8 which may be mounted on the base 6 and interengaged in any suitable manner and preferably locked together by a lock 9. This permits removal of the cabinet members 7 and 8 when necessary for maintenance of the terminal mechanism 4.

The terminal mechanism 4 (FIGS. 4-9) has a pair of enclosure-forming members generally indicated at 10 and 11. The enclosure member 10 is fixed and is mounted on the frame member 5 by brackets 12 bolted to member 5 with bolts 13. Brackets 12 have flange portions 14 and 15 bolted at 16 to end walls 17 and 18 of the member 10. A backup plate 19 is provided inside each end wall 17 and 18 to receive the bolts 16 which extend through the end walls.

The enclosure member 11 is pivoted on a pivot shaft 20, and is movable within the fixed enclosure member 10 on said pivot shaft between open and closed positions.

The pivot shaft 20 is journaled near its ends in bearings 21 which are bolted at 22 to bearing mounting plates 23 (FIG. 6) located on the outside of each enclosure member end wall 17 and 18. A backup plate 24 is located inside each end wall 17 and 18 and the mounting plates 23 and backup plates 24 are bolted together with bolts 25 which extend through the enclosure member end walls 17 and 18 to mount the bearings 21 on said end walls.

The shaft 20 extends through a partially tubular formation 26 located at one edge of the movable enclosure member 11 (FIGS. 14 and 15). There is an inturned sleeve 27 at each end of formation 26 which is shrunk onto or otherwise fixed to the shaft 20 (FIGS. 7 and 13).

Figure 6:
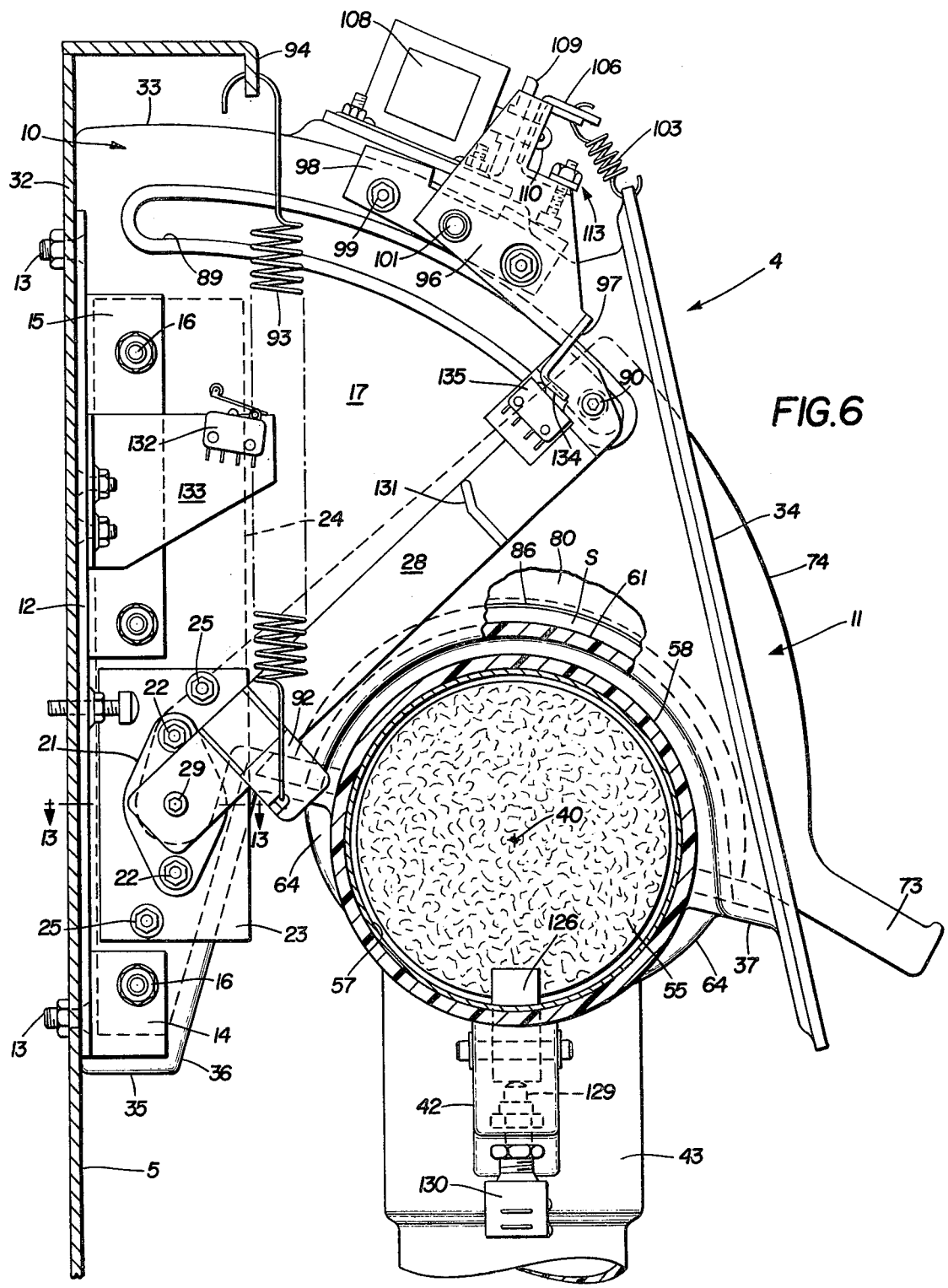
FIG. 6 is a view similar to FIG. 5 looking at the other end of the mechanism in the direction of the arrows 6—6, FIG. 4.

A door control arm 28 is bolted to the outer end of shaft 20 by bolt 29 outside of the bearing 21 mounted on the enclosure member end wall 17 (FIGS. 6 and 13). Similarly, an elongated angular door control arm 30 is bolted at 31 to the end of shaft 20 outside of the enclosure end wall 18. The purpose, function and operation of the control arms 28 and 30 are described below.

In accordance with the invention, to simplify the terminal enclosure construction so that it comprises a relatively small number of parts, the enclosure members 10 and 11 are molded of a polyethylene plastic material. Because of the formation of the enclosure members 10 and 11 of plastic material, metal mounting and backup plates are used where bolted connections or mountings are present.

The fixed enclosure member 10 has a back wall 32 which is connected laterally with the end walls 17 and 18, and also has a curved top wall 33 terminating forwardly in a flanged upper frame wall portion 34 (FIG. 7). At the lower end of the back wall 32 the member 10 has a narrow laterally extending bottom wall 35 from the inner edge of which an upwardly forwardly lateral wall portion 36 extends. The upper edge of wall portion 36 terminates with an enclosure separation wall which extends in a flat plane and has a number of formations therein, including spaced front and rear portions 37 and 38. The front and rear portion 37 and 38 of the flat separation wall are oriented in a slightly forwardly/-downward direction extending between the enclosure member end walls 17 and 18. The separation wall also is formed with a laterally extending semi-cylindrical portion 39 connected with the spaced front and rear portions 37 and 38.

The axis of the semi-cylindrical portion formation 39 lies in the flat plane of the separation wall. This axis is represented also as the central axis 40 of the pneumatic system carrier generally indicated at 41 in FIGS. 7 and 9, located at the position received in and sent from the enclosure formed by the members 10 and 11 of the terminal mechanism 4.

The semi-cylindrical portion 39 is formed intermediate its ends with a boxlike rectangular recess 42 (FIG. 7). An outturned cylindrical flange or nipple 43 extends downward from the semi-cylindrical portion 39 and recess 42 centrally thereof, which is connected at 44 with the system air shifter 45 by a conduit 46 (FIG. 4).

The air shifter 45 may have an exhaust outlet connected to a muffler 47, and the air shifter is also connected by conduits 48 and 49 with intake and blower outlet of a typical blower or air pump 50. These air shifter and air pump components are commonly used in pneumatic tube systems and are of known construction such as illustrated in said U.S. Pat. No. 4,059,246, and also in U.S. Pat. No. 3,232,559.

The semi-cylindrical formation 39 at its end where connected with the enclosure member end wall 18 (FIG. 9) has a special formation. It terminates in a cylindrical cup 51 having a closed bottom wall 52. The inner diameter of the cylindrical wall of cup 51 is the same as the inner diameter of the pneumatic tube system conveyor tube 57 which is connected, as described below, with the fixed enclosure member 10.

Figure 8:
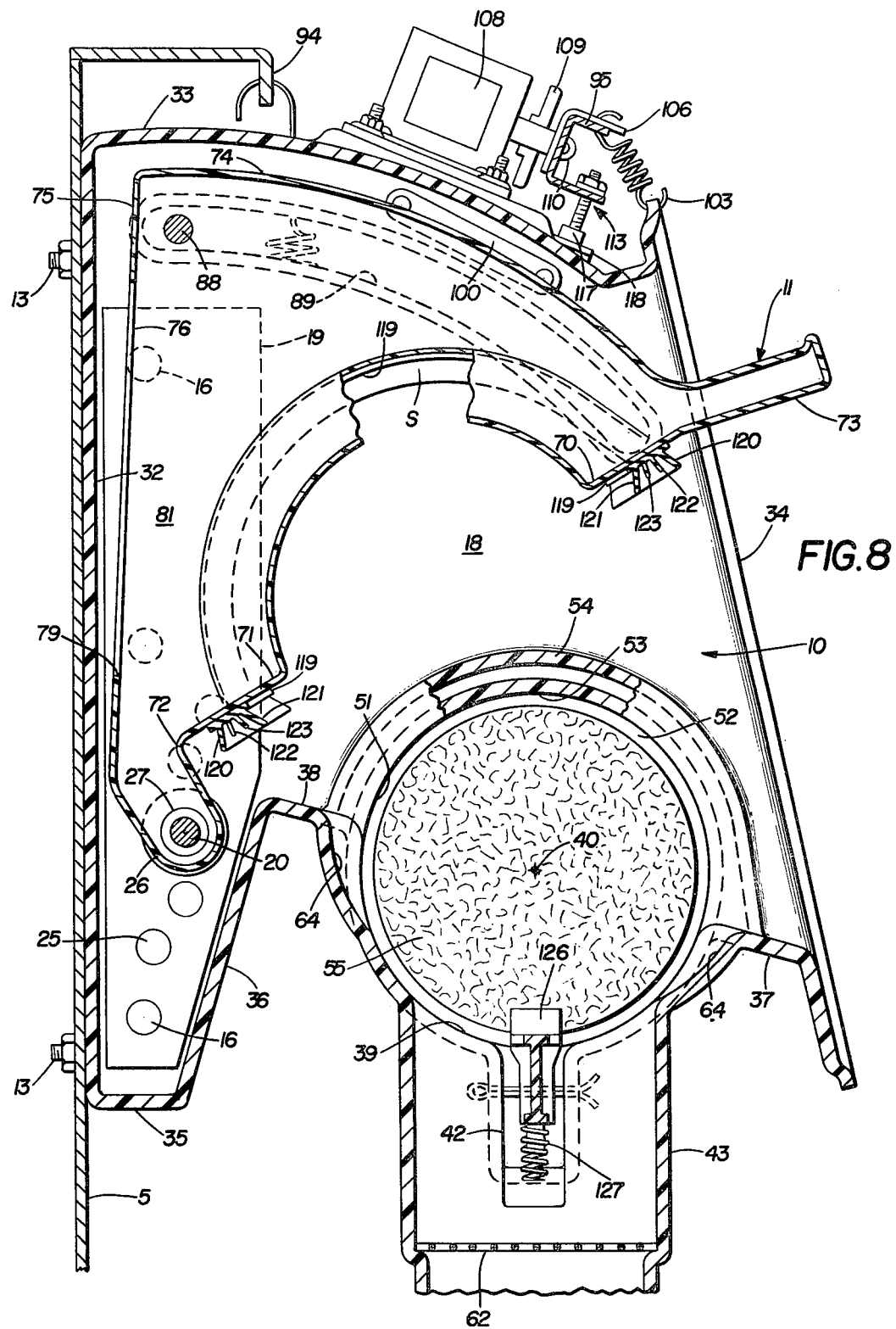
FIG. 8 is a sectional view similar to FIG. 7, but showing the enclosure door open.
Figure 9:
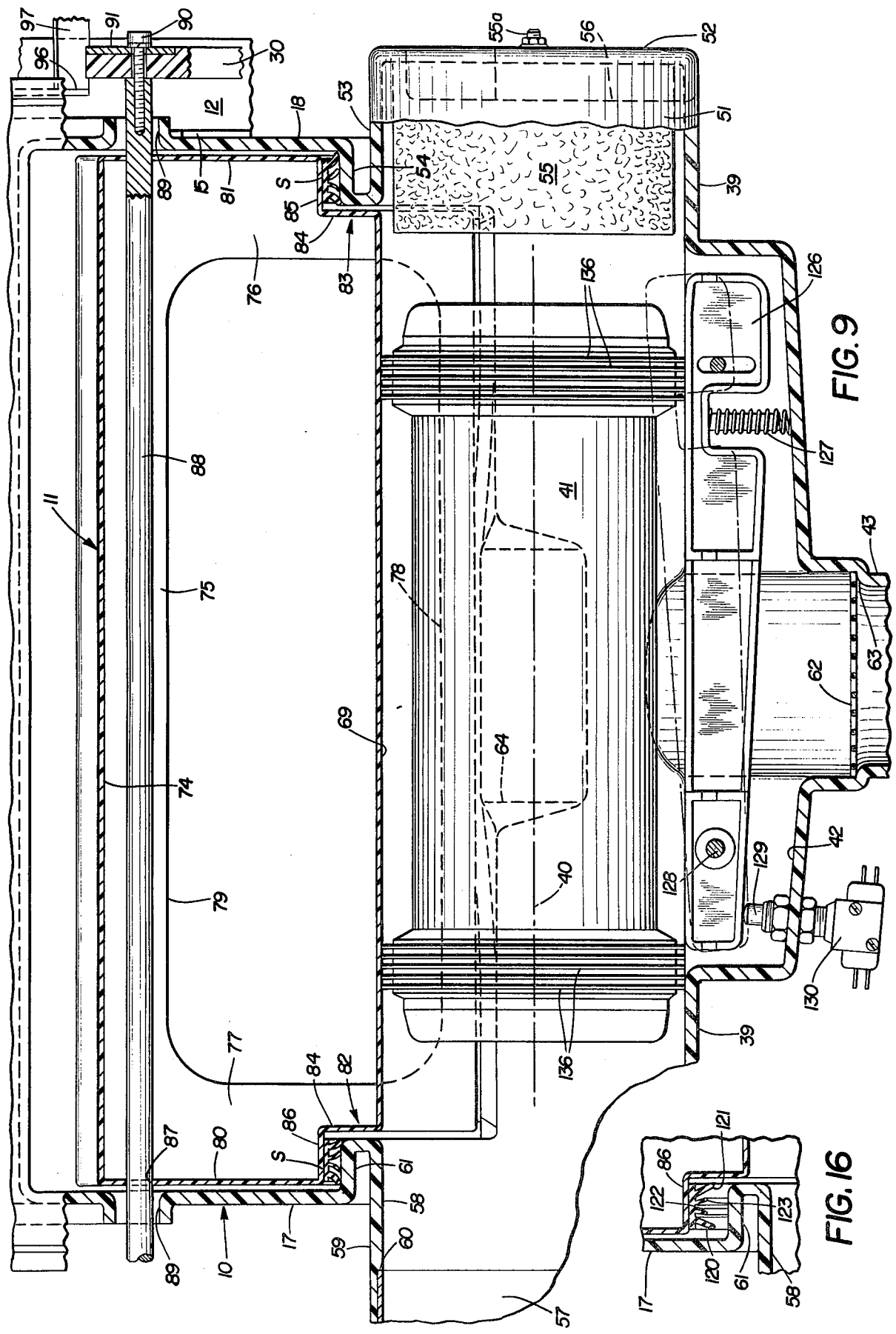
FIG. 9 is a longitudinal sectional view of the terminal enclosure members taken on the line 9—9, FIG. 7 illustrating a carrier that has arrived within the terminal enclosure.

Further, the inner radius of the cup wall formation 51 has its center in cross section on the longitudinal axis 40 of the semi-cylindrical portion 39 of the enclosure member 10. The upper portion of the cylindrical wall of cup 51 extending above the lower semi-cylindrical formation 39, indicated at 53 in FIGS. 8 and 9, is connected as a part of a reentrant flange 54 with the enclosure end wall 18. Cup 51 is preferably filled with a bumper pad 55 which may be retained in place by the bolt 55a.

The outer end portion and the end wall 52 of the cup 51 (FIG. 5) has an angular recess 56 formed therein extending a short distance axially inward from the end wall 52 to provide clearance for movement of the angular door control arm 30 as described below.

The end of the semi-cylindrical wall portion 39 of the fixed enclosure member 10 adjacent the end wall 17 also has a special formation somewhat similar to the manner in which the cup 51 is connected with the end wall 18 (FIG. 9). Thus, the lefthand end portion of semi-cylindrical wall formation 39 is continued with an upper cylindrical wall portion 58 forming a cylindrical nipple 59 extending outward from the enclosure member end wall 17. The nipple 59 is formed internally with a recess 60 into which an end portion of pneumatic system conveyor tube 57 is telescopically received for connecting the conveyor tube 57 with fixed enclosure member 10.

The upper portion of the nipple wall 59 is connected by a reentrant flange portion 61 with the enclosure end wall 17 in a manner similar to the reentrant flange connection 54 of the cup 51 with the end wall 18.

The fixed enclosure member 10 formed in one piece of plastic material, configured as described, when the movable member 11 is in the open position of FIG. 8, has an access window communicating with the pocket or semi-cylindrical portion 39. The ends of the window are defined by the upper cylindrical cup wall 53 and its reentrant flange 54 adjacent the enclosure member end wall 18, and by the upper cylindrical wall portion 58 and its reentrant flange 61 adjacent the other enclosure end wall 17 (FIG. 9).

When the movable enclosure member 11 is moved completely into member 10 to open position as shown in FIG. 8, a pneumatic tube system carrier 41, when located in the pocket of enclosure member 10, may be removed through the access window or, if not present, may be replaced into the semi-cylindrical pocket 10 through the window by a user, as described more fully below.

Preferably a foraminated disk 62, which may be formed from a piece of wire screen, preferably is located and held on a shoulder 63 in the flanged cylindrical nipple 43 below the semi-cylindrical wall portion 39 to act as a coin trap in event that coins being handled by a customer may drop out of a carrier 41 when the carrier is removed from or placed in the described pocket in the enclosure member 10.

Further, referring to FIGS. 6–9, slight relieved wall portions 64 preferably are formed opposite each other in the central portion of the upper edges of the semi-cylindrical wall 39 above the cylindrical nipple 43 to provide spaces for a user's fingers and thumb to remove a carrier from the enclosure pocket.

A damperlike flap (FIG. 4) preferably is located in the conduit 46, controlled by an adjusting device 65 so that the desired air flow characteristics for the system may be established and maintained when the terminal is installed, in accordance with the suction and pressure characteristics of the air shifter 45 and blower 50 components.

A flanged upper frame wall portion 34 has been described at the outer edge of the curved enclosure top wall 33. This frame wall flange 34 is an integral part of a rectangular frame flange generally indicated at 66 in FIGS. 1 and 4. Frame 66 defines a rectangular access opening 67 providing communication with the interior of the fixed enclosure member 10.

The preferably metal system conveyor tube 57 has been referred to. This tube may comprise sections with flanged couplings therebetween, one of which is indicated at 68 in FIG. 4. In this manner the pneumatic tube sections may be connected to the terminal, such as a downwardly curved section 57a indicated in dot-dash lines in FIG. 4; or such as a straight section 57b which may be directed upwardly beyond terminal 1 (not shown) by a curved section to provide an overhead connection with a teller terminal inside a bank building.

The tube section 57a may be connected with an underground tube installation between the customer terminal 1 and a teller station.

The movable enclosure member 11 pivotally mounted on shaft 20, shown detached from the mechanism in FIGS. 14 and 15, has a generally rectangular scoop shape with a semi-cylindrical recess or pocket wall 69. The wall 69 is connected at its longitudinal edges with an enclosure separation wall having spaced front and rear portions 70 and 71. These front and rear portions 70 and 71 of the separation wall extend in a flat plane which is parallel with and spaced from the plane of the separation wall of enclosure member 10 when enclosure member 11 is in the closed position of FIGS. 7 and 9. The space between the front and rear wall portions 70 and 71 of enclosure member 11 and the front and rear wall portions 37 and 38 of the enclosure member 10 contains seal means described below. The wall portion 71 is connected at a corner 72 with the partially tubular formation 26. The front wall portion 70 extends outward and is reversed upon itself to form a manipulating handle 73 for the member 11. The handle 73 is connected by a curved outer wall 74 which is adapted to telescope within the curved top wall 33 of enclosure member 10 when the member 11 is moved by the handle 73 to pivot on pivot shaft 20 from the closed position of FIG. 7 to the open position of FIG. 8.

The curved wall 74 terminates in an inturned flange 75. Flange 75 forms a part of a rectangular frame provided with end flanges 76 and 77 which join with a flange portion 78 which extends from the partially tubular formation 26. The flange portions 75, 76, 77 and 78 define a rectangular opening 79 (FIG. 9) leading to the interior of the molded plastic movable enclosure member 11.

The various walls 70, 71 and 74, and walls of handle 73, extend parallel to the axis of the pivot shaft 20 on which member 11 is pivoted, between enclosure member end walls 80 and 81.

The semi-cylindrical pocket enclosure wall 69, however, at its ends is formed with enlarged semi-circular recessed shoulders generally indicated at 82 and 83. The shoulders 82 and 83 are formed by curved wall portions 84 extending normal to the axis of shaft 20, and by semi-cylindrical wall portions 85 and 86 which, when enclosure member 11 is in closed position, and located, respectively, adjacent to but spaced from the reentrant flanges 54 and 61. This relationship also pertains to the seal means described below.

Openings 87 are formed in the end walls 80 and 81 of enclosure member 11 adjacent the corner between the curved outer wall 74 and inturned flange 75 through which a shaft 88 extends. The ends of shaft 88 project through arcuate slots 89 provided in the end walls 17 and 18 of enclosure member 10, and said ends are connected, respectively, with the upper ends of door control arms 28 and 30 by bolts 90. Metal strike plates 91 preferably are secured to the ends of shaft 88 by said bolts 90 outside of the end connections between the shaft 88 and the arms 28 and 30 for a purpose to be described.

The arms 28 and 30 are provided with ears 92 adjacent the arm connections with the ends of pivot shaft 20 (FIGS. 5 and 6). A tension spring 93 is hooked to each ear 92 and the other end of each spring is engaged with a flange 94 on frame member 5 to bias the enclosure member 11 normally to open position as shown in FIG. 8.

Referring to FIGS. 5, 6, 10, 11, 12, and 20 to 23, the enclosure mechanism is provided with latch mechanism which automatically latches the enclosure members 10 and 11 in closed position when the member 11 is moved to that position. A customer is requested to close member 11 when completing a banking operation, by moving the handle 73 down to closed position. This latching mechanism is unlatched as described below.

The latch mechanism includes a bar 95, channel-shaped in cross section, which extends along the top of the enclosure member 10 just behind the frame flange 34 (FIG. 4) and the bar is provided with down-turned end flanges 96 that have out-turned ears 97.

Brackets 98 are mounted at the top of the end walls 17 and 18 of enclosure member 10, along the curved top wall 33 by bolts 99 which extend through the end walls 17 and 18 and engage backup plates 100. Stud shafts 101 are mounted on the brackets 98 projecting outwardly therefrom outside the enclosure end walls 17 and 18 and the end flanges 96 are pivotally mounted on said stud shafts.

The strike plates 91 (FIGS. 5, 6 and 23) mounted on the ends of door control arms 28 and 30 have notches 102 formed therein which engage the out-turned ears 97 on end flanges 96 of channel bar 95 when the arms 28 and 30 move with the enclosure member 11 to closed position as shown in FIGS. 5 and 6, to latch the member 11 closed.

This automatic latching results because the bar 95 is biased counterclockwise (FIG. 5) to the latched position by spring 103 connected between the bar 95 and upper frame flange 34 (FIGS. 4, 5 and 6). FIG. 23 shows the flange 96 and ear 97 moved to unlatched position to disengage the ear 97 from the notch 102 by pivotal movement of the bar 95 and end flanges 96 on stud shafts 101 in the direction of the arrow 104.

Referring to FIGS. 4, 7, 20 and 21, the channel bar 95 is midway formed with an opening 105 in its web and part of its upper flange over which an angle bracket 106 is secured having a smaller opening 107 therein. A solenoid 108 is mounted on the curved enclosure member top wall 33 opposite the openings 105 and 107. The solenoid armature 109 has spaced prongs 110 which project through said openings 105 and 107. The prongs 110 are connected by a pin 111 which engages the back wall of bracket 106 inside of the opening 107 as shown in FIGS. 20 and 21.

When the solenoid 108 is energized its armature 109 is moved upward (FIG. 21) in the direction of the arrow 112 thereby pivoting the bar 95 on the stud shafts 101 in the direction of the arrow 104 (FIG. 23) to disengage the latch between ears 97 and strike plate notches 102 to release the enclosure member 11 from being held latched in closed position so that it automatically opens by the tension of biasing springs 93. The solenoid 108 is energized under circumstances described below.

The movement of the channel bar 95 in one direction by a biasing spring 103 is controlled by an adjustable stop device generally indicated at 113 in FIGS. 4, 6, 7, 11 and 22 and best illustrated in FIG. 22. One of the stop devices 113 is mounted at each end of the bar 95 just inside of the end flange 96 (FIG. 4). The device includes a stud bolt 114 threaded into a nut 115 fixed to the lower flange member of channel bar 95 and held in adjusted position by locknut 116. The head 117 of the stud bolt holds the bar 95 in the desired position of adjustment by engaging a flange 118 projecting from the bracket 98 on which the end flange 96 is pivoted (FIG. 11).

A seal has been referred to for sealing the joint between enclosure members 10 and 11 when the enclosure door member 11 is closed. Various portions of and details of this seal are illustrated in FIGS. 7-9 and 14-19. The seal S comprises an elastomeric strip having a special configuration in cross section normally as shown in FIGS. 8, 14, 16 and 18. Seal S has a striplike base 119 and four projecting tongues 120, 121, 122 and 123 which extend continuously throughout the length of the seal S. The tongues 120 and 121 angle outwardly from the base and from each other and are thicker and longer than the tongues 122 and 123 which also preferably angle slightly outwardly away from the base and each other.

The seal S extends continuously and endlessly along and is cemented or otherwise secured to surfaces of enclosure door member 11. In its endless extent it is applied to the front and rear wall portions 70 and 71 of member 11 and jogs radially and then axially in an angular formation 124 at each end of each wall portion 70 and 71. Then it extends along the semi-cylindrical wall portions 85 and 86 in the shoulders 82 and 83 at the ends of the semi-cylindrical pocket formed by the wall 69, as indicated at 125 in FIGS. 14 and 15 and also in FIG. 16.

This endless extent of the seal S thus seals all portions of the joint between the members 10 and 11 when the door member 11 is closed, for example, as shown in FIGS. 7 and 9. In FIG. 7 the joints between the spaced parallel separation walls 70-71 and 37-38 contain the seals in sealing state, while the same sealing state is illustrated in FIG. 9 between the semi-cylindrical wall portions 85 and 86 of member 11 and reentrant flanges 54 and 61 of member 10.

The sealing action is illustrated in FIGS. 17, 18 and 19 wherein the closed condition is illustrated in FIG. 18, initial sealing contact is indicated in FIG. 19 where the tongues 120 and 121 start to spread open, and the final seaing state is shown in FIG. 17 where all of the tongues have spread open and their outer edges make sealing contact along four lines of contact under the pressure of their tongues which tend to try to return to the configuration shown in FIG. 18 due to being elastomeric material.

This spread seal construction has proven to be very effective in use against air leakage when containing either pressure or vacuum within the chamber or enclosure formed between the semi-cylindrical walls of the enclosure members 10 and 11.

Since the door enclosure member 11 is manually closed by a customer it is important that it be closed to produce an air seal with minimum manual effort. The construction of the seal S satisfies this requirement. The angled flanges splay outward on contact with the surface against which the seal is compressed, thereby reducing the force required to close the door enclosure member 11 and provide the air seal between members 10 and 11.

Further, the splaying action compensates for non-parallel or irregular mating surfaces of the plastic material enclosure members 10 and 11.

Fundamentally when system pressure exists inside the enclosure formed by the semi-cylindrical walls 69 and 39, respectively, of members 11 and 10, such pressure increases the contact of the inner angled tongues 121 and 123 (FIGS. 7, 9 and 17) of the seal or gasket S against the surface contacted by such tongues.

Similarly, when system vacuum is present in the enclosure formed by enclosure members 10 and 11 the vacuum increases the contact of the outer tongues 120 and 122 of the seal or gasket S against the surface being contacted by such tongues (FIGS. 7, 9 and 17).

The enclosure formed by members 10 and 11 is normally closed, that is, member 11 is in the closed position of FIGS. 6 and 7 at the beginning of a day or after a customer has closed the door member 11 and left the customer station. On the arrival of the next customer at the customer station the customer is directed, preferably by a sign, to press a service button 126a which alerts a teller in the teller station that a customer desires to carry out a banking transaction.

The teller then places a carrier in the teller terminal connected with the customer terminal at the customer station where the customer is located. System vacuum mode is activated to propel the carrier to the customer teminal 1. An arriving carrier is indicated at 41 in FIG. 9. The carrier 41 on arrival moves lever 126, normally in the dot-dash line position of FIG. 9, to the full line position against the pressure of biasing spring 127 to swing lever 126 on pivot 128 which releases switch actuator 129 of switch 130.

Upon release, switch 130 shuts down the blower 50 which has established the vacuum mode for system operation through air shifter 45. After a slight delay, switch 130 also energizes the solenoid 108 so that its armature 109 moves channel bar 95 from the position of FIGS. 6 and 7 to that of FIG. 10 which unlatches the latch which has held the door enclosure member 11 closed. The door then automatically is opened by tension springs 93, thus enabling the customer to remove the carrier 41 from the enclosure pocket and place banking transaction material into the carrier.

Such banking transaction material, for example, may be a check to be cashed or a check or other material to be deposited.

Meanwhile, as the door opens from the position of FIG. 10 through that of FIG. 11 to the position of FIG. 12, the door control arm 28 (FIG. 6) moves to the position of FIG. 12 and the switch actuator 131 trips a switch 132 carried by a bracket 133 mounted on the bracket 12, as shown in FIG. 12. Tripping switch 132 resets air shifter 45 from a vacuum mode to a pressure mode.

The customer then replaces the carrier 41 into the enclosure pocket and grasps the handle 73 of door member 11 and moves it to the closed position of FIG. 6. On reaching this closed position the door 11 is latched closed by engagement of the ears 97 in the notches 102 of strike plates 91.

When the door enclosure member 11 is thus latched closed, as shown in FIG. 6, a foot 134 extending from the outturned ear 97 adjacent the end wall 17 of enclosure member 10 trips a switch 135 on control arm 28. Tripping switch 135 energizes the blower with the system in pressure mode to propel the carrier 41 to the teller terminal inside the bank building.

There is a cooperative relationship between the ear 97 and the foot 134 thereon adjacent the end wall 17 of fixed enclosure member 10 as shown in FIG. 6. The door enclosure member 11 must be closed and latched before the switch 135 is or can be actuated to energize the system air supply to deliver the carrier 41 to the teller unit. If it should happen that the door enclosure member 11 is improperly closed so that it is not latched, the switch 135 is not actuated and the air supply is not energized. This prevents the door member 11 from being blown open by air pressure if the system pressure mode some way is established when the door member 11 is not latched closed and the switch 135 actuated.

Another important feature of the construction is best illustrated in FIG. 9. As vacuum mode operation of the system draws a carrier 41 into the customer terminal enclosure the location of the system vacuum supply, through the nipple 43 centrally below the enclosure chamber, reacts between the carrier accelerator rings 136 to reduce carrier velocity abruptly. Thus impact of the carrier end on the bumper pad 55 is negligible. As a result the arrival is quiet and little, if any, shock must be absorbed by the terminal.

The resultant effect of the conditions just described may well be termed as "air brake" effect in arresting carrier movement without noise or shock.

Simplified features of the new construction have been described including automatically opening the door member 11 on arrival of a carrier in the enclosure sensed by a member actuated by the carrier to unlatch the door, and the manual customer closing of the door member 11 which accompanied by latching the door closed automatically dispatches the carrier to a teller station in normal use of the terminal facilities. This simplified construction eliminates the requirement of a motor drive and control circuitry for opening and closing the door member 11.

However, there is one situation that may occur if the door member 11 is left open by a customer accidentally, particularly at the night closing time for the visual pneumatic tube banking facilities. If this occurs, a bank employee must leave the bank building and travel to the customer terminal 1 and close the door member 11.

This problem may be handled by providing a simple door closing mechanism with a small motor actuated by a switch at the teller station. Thus, a small motor 137 may be mounted on a bracket 138 carried by frame member 5 (FIGS. 4 and 5) below the enclosure. Motor 137 has a sweep arm 139 mounted on the motor shaft which rotates one revolution when the motor is energized by teller actuation of a switch at the bank, as shown by the arrow 140.

During this movement of the arm 139 through 360°, from the full-line position shown in FIG. 5 back to said position, a roller 141 at the outer end of the arm 139 engages the extension 142 on door control arm 30 when the door member 11 is open to close the door member 11 as illustrated by the dot-dash position of sweep arm 139 in FIG. 5.

When the sweep arm 139 completes one revolution, roller 141 actuates switch 143 to stop motor 137 which thus becomes a one revolution door-closing motor that operatively engages the door control arm 30 for remotely teller-closing the door member 11.

All of the metal components of the terminal that are attached to the enclosure or housing members formed of plastic material are not and cannot be attached directly to such plastic material walls. The plastic material is clamped between metal components in all instances to minimize stress on or fracture of the plastic material. This has been described when referring to brackets that are bolted through the enclosure member walls to backup plates on the other side of such walls.

The operation and use of the improved customer terminal 1 for carrying out normal banking operations has been described, and important aspects of the new mechanism are summarized below.

The customer terminal 1 for a single tube pneumatic tube system extending between customer and teller terminals with visual contact between the customer and teller at such terminals has a simple and inexpensive construction fundamentally comprising a pair of enclosure members formed of plastic material hinged together, one being in fixed position in the terminal, and the other being a movable door, so that when the door is closed a cylindrical enclosure or pocket extension is provided at an end of the system tube connected to the terminal. The enclosure members when closed have a sealed joint between semi-cylindrical walls of said members. The fixed member is mounted on a frame within the terminal cabinet and the other member is a door which is telescoped into the fixed member when opened.

The door member is normally latched closed and upon arrival of a vacuum impelled carrier in the cylindrical pocket, the latch is released to enable the door to open automatically by a biasing spring.

The customer in conducting a banking transaction removes the carrier from the pocket and then replaces the carrier in the pocket and manually closes the door. The door is automatically latched when closed and system air pressure is established to convey the carrier to the teller terminal.

Typical blower-air shifter vacuum or pressure airflow is supplied to the cylindrical pocket. System air acts as an air brake to abruptly arrest vacuum impelled carrier movement upon arrival in the terminal with little noise and negligible shock to the equipment.

A special seal construction provides the seal between the fixed and movable enclosure members. The sealing function is effective against either system vacuum or pressure loss when operating in either a vacuum or a pressure mode. The seal member has a unique cross-sectional shape and may be formed of neoprene.

Preferably the simple enclosure is provided with a simple one-revolution operating motor which may be actuated by a teller for closing the movable enclosure member in the event the enclosure door is inadvertently or accidentally left open by a customer.

The power supply circuitry is extremely simple since usual power connections are made for activation and deactivation of the blower and air shifter. There is no reversible motor drive for opening and closing the door. Only a simple circuit is required for the simple motor for teller-closing the door when accidentally left open. The switches described and their power connections are all simple known switches, and the power supply may involve a low-voltage system, and, thus, wiring and wiring protection is simplified as is well known in the art.

Accordingly, the concepts of various aspects of the invention described in detail provide a new pneumatic tube banking system customer terminal construction having cooperatively arranged components and a simplified construction and mode of operation which achieve the stated objectives, eliminate difficulties or problems which have arisen with prior devices, and solve problems and obtain the described new results.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the terminal is constructed and operated, and the advantageous, new and useful structures, devices, elements, arrangements, parts, combinations and cooperative relationships are set forth in the appended claims.

We claim:

1. A customer terminal for a single conveyor tube visual banking service pneumatic tube system of a type wherein carrier propelling vacuum or pressure airflow is supplied to the system by blower and air shifter units located in the terminal, and an end of said system conveyor tube is connected with the terminal; the improvement in which the terminal includes:
   (1) a frame member mounted on a terminal base;
   (2) a pair of enclosure members, one of which is provided with an access opening and is mounted in fixed position on said frame member, and the other of which is pivotally mounted on the fixed member and acts as a door for the fixed member access opening;
   (3) the door enclosure member being movable between a closed position convering said access opening and an open position telescoped into the fixed enclosure member uncovering said access opening;
   (4) each of the fixed and door enclosure members being formed of plastic material and having semi-cylindrical pocket forming wall portions;
   (5) coupling means between an end portion of a system conveyor tube and the fixed enclosure member;
   (6) the semi-cylindrical wall portions of said pair of enclosure members when in closed position forming a cylindrical extension of said system tube end portions with said cylindrical extension and said system tube end portion having the same internal diameter and their axes coinciding; and (7) the fixed enclosure member having a closed-end-cup-wall connected with its semi-cylindrical wall portion at the end of said semi-cylindrical wall portion remote from said coupling means.

2. The construction defined in claim 1 in which bumper means is located in said closed-end-cup-wall.

3. The construction defined in claim 1 in which the coupling means between an end portion of said system conveyor tube and the fixed enclosure member includes a cylindrical nipple that is formed as a part of and extends from the fixed enclosure member semi-cylindrical wall portion.

4. The construction defined in claim 3 in which the cylindrical extension of said system tube end portion formed by said pair of enclosure members when in closed position, the said system tube end portion, and said cylindrical nipple, all have a common horizontally extending axis.

5. The construction defined in claim 1 in which the system carrier propelling airflow supplied to the system by blower and air shifter units is connected to said cylindrical extension of said system tube end portion intermediate the ends of said cylindrical extension to provide an air brake effect on a carrier vacuum propelled into the enclosure between spaced carrier accelerator rings, to abruptly arrest carrier movement on arrival in said cylindrical extension.

6. The construction defined in claim 1 in which said fixed enclosure member is formed with a back wall, a curved top wall, and spaced end walls integral with the semi-cylindrical pocket-forming wall portion thereof; in which said walls and wall portion form said fixed member access opening; in which the pivotal mounting of said door member on said fixed member includes a pivot shaft; in which the ends of the pivot shaft are journaled in and extend through bearings mounted on the fixed member end walls; in which a door control arm is connected outside each end wall with an end of said pivot shaft; in which arcuate slots are formed in said fixed member end walls spaced from and formed on said pivot shaft axis as a center; in which said door member is provided with a connector shaft having end portions projecting through said arcuate slots; and in which the ends of said door control arms remote from the pivot shaft are connected with said connector shaft end portions outside of said fixed member end walls.

7. The construction defined in claim 6 in which air shifter unit control switch means is mounted on the frame member; in which switch actuator means for said air shifter control switch means is mounted on one of said door control arms; in which upon movement of said door enclosure member to open position said air shifter control switch is actuated by said switch actuator to enable pneumatic system pressure operation; in which system airflow control switch means is mounted on one of said door control arms; in which latch mechanism is provided for latching the door member closed when moved to closed position; and in which said latch mechanism upon latching said door member in closed position actuates said system airflow control switch means to establish pressure operation of the system automatically thereby to propel out of said cylindrical extension formed by said pair of enclosure members and into the system conveyor tube a carrier placed in the fixed member semi-cylindrical pocket before closing the door member.

8. The construction defined in claim 7 in which said latch mechanism includes latch bar means pivotally mounted on said fixed enclosure member having latch ear means; in which strike plate means is mounted on a remote end of at least one of said door control arms; in which the strike plate means has a latch notch formed therein; in which the latch bar means is biased to engage said latch ear means with said latch notch when the door member is in closed position; and in which means is provided to disengage said latch mechanism automatically upon arrival of a carrier in said cylindrical extension formed by said pair of enclosure members when in closed position.

9. The construction defined in claim 8 in which said latch mechanism disengaging means includes a solenoid having an armature operatively connected with said latch bar means, and sensor means in said cylindrical extension operative on arrival of a carrier in said cylindrical extension to energize said solenoid to actuate the armature operatively to pivot said latch bar means to disengage said latch ear means from said latch notch.

10. The construction defined in claim 9 in which said sensor means also disables system airflow supply upon carrier arrival in said cylindrical extension.

11. The construction defined in claim 10 in which said sensor means includes a carrier arrival switch, and a lever pivotally mounted intermediate its ends on the fixed enclosure member having one end biased to project into said semi-cylindrical pocket and the other end operatively located adjacent said arrival switch; in which said lever projecting end is engaged by a carrier arriving in said cylindrical extension and pivotally moved so that said other end actuates said arrival switch to disable airflow supply to the system and to unlatch the door member; and means biasing the door member to open position when unlatched.

12. The construction defined in claim 7 in which said latch mechanism includes latch bar means pivotally mounted on said fixed enclosure member having latch ear means; in which strike plate means is mounted on a remote end of said door control arm on which said system airflow control switch means is mounted; in which said strike plate means and said airflow control switch means are located on said door control arm adjacent one another; in which the strike plate means has a latch notch formed therein; in which the latch bar means is biased to engage said latch ear means with said latch notch when the door member is in closed position to latch the door member closed; in which a foot extends from said latch ear means; and in which said foot actuates said airflow control switch means to supply airflow to the system after said ear means has engaged said latch notch to latch the door member closed.

13. The construction defined in claim 1 in which the door enclosure member is biased to open position, is adapted to be manually moved to closed position, and is provided with latch mechanism automatically latching the door member closed when moved to closed position.

14. The construction defined in claim 13 in which the system has pressure and vacuum modes of operation, in which air shifter unit control switch means is mounted on the frame member, and in which upon biased movement of said door enclosure member to open position said air shifter switch means is enabled to establish pressure operation mode for the system.

15. The construction defined in claim 14 in which the door enclosure member is provided with system airflow control switch means; and in which said latch mechanism, upon latching the door member closed following manually closing said door member, enables pressure operation of the system automatically to propel out of the enclosure and into the system conveyor tube a carrier placed in the enclosure pocket before closing the door.

16. The construction defined in claim 15 in which the door enclosure member has a door control arm connected thereto; in which an actuator for said air shifter control switch means is mounted on said arm; in which upon biased movement of said door enclosure member to open position said actuator engages said air shifter control switch means to enable pressure mode operation of the system when the door member is closed; in which said system airflow control switch means is mounted on said door control arm; and in which said latch mechanism upon latching the door enclosure member closed when moved to closed position actuates said airflow control switch means to supply system airflow for pressure mode operation.

17. The construction defined in claim 1 in which connected separation wall portions extend endlessly around the longitudinal edges and semi-cylindrical end portions of the fixed and door enclosure members; in which the endlessly extending separation wall portions of the fixed and door enclosure members are located adjacent but in spaced matching relationship to one another when the door member is in closed position; and in which endless seal means mounted on the endless separation wall portions of one of said enclosure members is in compressed sealing contact with the endless separation wall portions of said other enclosure member in said space between said separation wall portions of said enclosure members when the door member is closed.

18. The construction defined in claim 17 in which the endless seal means comprises elastomeric material formed with a striplike endless base mounted on the endless separation wall portions of one of said enclosure members; in which at least two flexible tongues spaced laterally apart extend longitudinally endlessly along said base; in which said tongues in cross section extend angularly outwardly away from each other from said base toward the endless separation wall portions of said other enclosure member; and in which said tongues are splayed apart to establish said compressed sealing contact when the door member is in closed position.

19. The construction defined in claim 18 in which the endless seal means base is mounted on the endless separation wall portions of the door enclosure member.

20. The construction defined in claim 19 in which there are four spaced apart flexible tongues projecting from the striplike base, two of which in cross section are angled outwardly generally in one direction away from the base, and two of which are angled outwardly generally in the other direction away from the base.

21. The construction defined in claim 17 in which the endlessly extending separation wall portions of the fixed and door enclosure members include flat flangelike portions extending along the longitudinal edges of each of said enclosure members; in which saddlelike semi-cylindrical separation wall portions outwardly offset from the semi-cylindrical pocket wall of said door enclosure member are formed at each end of said door enclosure member semi-cylindrical pocket wall; in which the cup wall portion of the fixed enclosure member has an upper reentrant flange forming a saddlelike semi-cylindrical separation wall portion surrounding the upper cup wall portion within the saddlelike separation wall portion at one end of said door enclosure member; in which the fixed enclosure member includes a cylindrical nipple that is formed as a part of and extends from the fixed enclosure member semi-cylindrical wall portion; and in which an upper portion of said cylindrical nipple is formed with a reentrant saddlelike semi-cylindrical separation wall portion surrounding the upper portion of said cylindrical nipple within the saddlelike separation wall portion at the other end of said door enclosure member.

22. The construction defined in claim 1 in which the door enclosure member is biased to open position, is adapted to be manually moved to closed position, and is provided with latch mechanism automatically latching the door member closed when moved to closed position; and in which door closing mechanism is provided adapted to be actuated at a system teller station to close the door member in the event that the door member accidentally is left open by a customer.

23. The construction defined in claim 22 in which said door-closing mechanism includes, a door control arm which is pivotally mounted on the fixed enclosure member and is connected to the door enclosure member, an extension on said arm projecting from the arm pivotal mounting to a location below said fixed member, a motor having a rotatable shaft mounted on the frame member below said fixed member, a sweep arm having one end mounted on the motor shaft for rotation with the motor shaft, roller means mounted on the sweep arm spaced from the motor shaft and engageable with said control arm extension during rotation of the sweep arm when the door member is in open position, and motor disabling switch means located in the path of travel of said roller means during rotation of said sweep arm; whereby when the door member is open and the motor is enabled said roller means, during sweep arm rotation through 360° by the motor, first engages said control arm extension and moves the door member to closed position, and then engages said motor-disabling switch means to disable the motor after 360° rotation.

24. The construction defined in claim 22 in which the door enclosure member is provided with door control arm means; and in which said door-closing mechanism includes one revolution door-closing motor means that operatively engages said door control arm means when said door-closing motor means is energized while the door member is open.

25. The construction defined in claim 1 in which the terminal is provided with a removable cabinet mounted on the base; in which said cabinet has a framed opening; and in which the fixed enclosure member is formed with a rectangular frame flange engaging said framed cabinet opening and defining said fixed member access opening.

* * * * *